United States Patent
Marc

(10) Patent No.: US 10,288,109 B2
(45) Date of Patent: *May 14, 2019

(54) SELF-LOCKING SCREWING ATTACHMENT DEVICE AND ASSEMBLY PROVIDED WITH SAME

(71) Applicant: JPB Systeme, Montereau sur le Jard (FR)

(72) Inventor: Damien Marc, Nangis (FR)

(73) Assignee: JPB Système, Montereau sur le Jard (FR)

(*) Notice: Subject to any disclaimer, the term of this patent is extended or adjusted under 35 U.S.C. 154(b) by 768 days.

This patent is subject to a terminal disclaimer.

(21) Appl. No.: 14/492,830

(22) Filed: Sep. 22, 2014

(65) Prior Publication Data
US 2015/0063939 A1     Mar. 5, 2015

Related U.S. Application Data

(63) Continuation-in-part of application No. 13/505,922, filed as application No. PCT/FR2010/052358 on Nov. 3, 2010, now Pat. No. 8,840,348.

(30) Foreign Application Priority Data

Nov. 5, 2009  (FR) ..................................... 09 57838

(51) Int. Cl.
  F16B 39/32      (2006.01)
  F16B 39/26      (2006.01)
  F16B 39/282     (2006.01)

(52) U.S. Cl.
  CPC ............. *F16B 39/26* (2013.01); *F16B 39/282* (2013.01); *F16B 39/32* (2013.01)

(58) Field of Classification Search
  CPC ......... F16B 39/26; F16B 39/822; F16B 39/32
  (Continued)

(56) References Cited

U.S. PATENT DOCUMENTS 1,646,805 A    10/1927  Bell
3,917,373 A *  11/1975  Peterson .............. H01R 13/621
                                                  285/82

(Continued)

FOREIGN PATENT DOCUMENTS

CH           29609 A      9/1904

OTHER PUBLICATIONS

European Patent Office; Search Report in International Patent Application No. PCT/FR2010/052358 dated Mar. 17, 2011; 4 pages.
(Continued)

*Primary Examiner* — Gary W Estremsky
(74) *Attorney, Agent, or Firm* — Dorton & Willis, LLP

(57) ABSTRACT

A nut for securing first and second pipe end-pieces together includes a nut lock having a stop member secured to the nut body, and a second element which is rotatable inside the nut body and having a locking feature adapted to lock onto a corresponding locking structure of the second end-piece. The stop member and the second element include corresponding face teeth which are urged to intermesh by an axial compression spring. At or near the tightened condition of the assembly, the second element is locked onto the second end-piece so that rotation of the nut is possible only if the torque applied exceeds a given threshold, for which the face teeth jump over each other while the spring is alternately stressed. A compact design is obtained with the lock positioned at the rear of the nut thread. The clamping face is axially between the nut thread and the lock.

70 Claims, 5 Drawing Sheets

(58) Field of Classification Search
USPC ................................ 411/128; 285/86, 92, 89
See application file for complete search history.

(56) References Cited

U.S. PATENT DOCUMENTS

| | | | | |
|---|---|---|---|---|
| 5,074,703 A * | 12/1991 | Dawson | ................... | G05G 5/12 |
| | | | | 403/320 |
| 5,435,760 A * | 7/1995 | Miklos | ................. | H01R 13/516 |
| | | | | 285/92 |
| 5,533,849 A * | 7/1996 | Burdick | ................. | F16C 25/06 |
| | | | | 411/120 |
| 5,851,035 A | 12/1998 | Marc et al. | | |
| 5,897,277 A | 4/1999 | Barre et al. | | |
| 7,914,311 B1 * | 3/2011 | Gallusser | ............. | H01R 13/639 |
| | | | | 439/321 |
| 2006/0151994 A1 * | 7/2006 | Marc | .................... | F16L 19/005 |
| | | | | 285/92 |

OTHER PUBLICATIONS

French Patent Office; Search Report in French Patent Application No. 0957838 dated Jul. 8, 2010; 2 pages.

\* cited by examiner

SELF-LOCKING SCREWING ATTACHMENT DEVICE AND ASSEMBLY PROVIDED WITH SAME

TECHNICAL FIELD

The present invention relates to a self-locking screwing attachment device including a nut screwed onto a threaded tip.

The present invention also relates to an assembly of at least two parts attached to each other by such a device.

The self-locking attachment device has the object to prevent two parts from being importunately unscrewed with respect to each other, in particular in applications where both pieces are subjected when operated to vibrations or shakes. This is applicable to an assembly of three or more parts.

BACKGROUND

Self-locking screwing attachment devices for securing at least two parts to each other, having generally the form of a nut screwed onto a threaded tip, provided with strengthened releasable coupling means, for preventing said at least two parts from being importunately unscrewed, are known. This strengthened coupling means perform a self-locking of the coupling when screwing the nut on the tip.

These known devices generally have drawbacks of several kinds:

the nut consists of several separable parts which can be lost and should be assembled according to an accurate order, nut not adapted to parts to be assemble and/or to threaded tips having multiple shapes and not necessarily standard; the friction surfaces required for the clamping are highly dependent on the shape of parts to be assembled, resulting in an uncertain clamping efficiency according to configurations; the adaption of these known nuts sometimes requires a significant and extensive machining, poorly optimized dimensions.

SUMMARY

The purpose of the invention is to overcome all or part of the previous drawbacks by providing a self-locking screwing attachment device for attaching at least two parts to each other, which is compact, made as a single piece, adaptable to configurations and shapes of multiple non-standard parts, or demanding as little machining as possible.

For that purpose, one object of the invention is to provide a unitary self-locking screwing attachment device for being part of an assembly having locking structure and for engaging a threaded member of said assembly, the attachment device comprising:

a first element having a threaded body for thread engagement with said threaded member during screwing and unscrewing towards and away from a threaded condition, respectively; and a lock in turn comprising:

a second element rotatably and captively supported onto said threaded body and provided with a locking feature to engage said locking structure at least when said assembly is in or close to the tightened condition;

a stop member rotatably secured to the threaded body;

a releasable coupling means arranged for releasably coupling the stop member and the second element for common rotation;

spring means for resiliently activating said releasable coupling means;

wherein said releasable coupling means and said spring means are configured and arranged to allow relative rotation of said stop member and said second element in a screwing direction when a torque applied to said device exceeds a predetermined screwing torque threshold and to allow relative rotation of said stop member and said second element in an unscrewing direction when an unscrewing torque applied to said device exceeds a predetermined unscrewing torque threshold.

Preferably, said releasable coupling means consists of a first and a second group of axially directed teeth, said first group secured to the stop member and said second group secured to the second element.

In an embodiment, said device is a nut and the threaded member includes a male thread extending along a screwing axis and onto which the thread of the nut is screwed and unscrewed.

Typically, the stop member and the spring means have generally annular shapes and are accommodated within a supporting cylinder belonging to the first element.

In one embodiment of the device as a nut, the first element has a hollow supporting cylinder and the spring means, the stop member and the releasable coupling means are accommodated within a chamber formed in the tightened condition radially between the threaded member and an inner face of the cylinder.

In a preferred embodiment, the stop member is integrally secured to the first element, and the second element is mounted axially between the stop member and an axial stop secured to the first element. Then, the stop member may be adjacent the threaded body the spring means being axially between the second element and the axial stop.

When the stop member is integrally secured to the first element, the second element may be mounted axially between the stop member and an axial stop secured to the first element, the axial stop comprising a plastically bent end lip of the cylinder which is secured to the first element.

The first element typically has a clamping face for transmitting a clamping force into the assembly in the tightened condition, In one embodiment, the lock and the clamping face are on either side of the thread of the threaded body. This embodiment is more particularly advantageous when the threaded member is a threaded tip with the locking structure provided on the threaded tip axially beyond the thread of the threaded tip.

Typically, the clamping face is at or beyond a front end of the thread of the threaded body, with respect to the screwing direction.

In another embodiment, the first element has a clamping face for transmitting a clamping force into the assembly in the tightened condition, and the clamping face is axially between the thread of the threaded body and the lock. This embodiment is more particularly advantageous for a nut to be screwed onto a thread of a support such as one pipe end-piece while the adjacent part to be secured is the other pipe end-piece and extends through the nut and is provided with the locking structure.

The locking feature is advantageously a radially inner feature of the second element. When said device is a nut, said locking feature is to engage said locking structure being annular and provided on the threaded member or on the adjacent part axially beyond a thread of the threaded member.

Preferably, said locking structure is radially small enough to travel axially through the nut from the locking feature throughout the nut thread of the threaded body.

This allows to remove axially the nut in the untightened condition, at least to the extent needed, e. g. moving the end-pipes laterally with respect to each other in the case of a pipe connection, or extracting the adjacent part in the case of a part-fastening device.

In an embodiment, said locking feature is a female polygonal formation.

The second element may be axially movable with respect to the first element and be configured and arranged to be axially clamped between the first element and the threaded member or said part to be assembled and to transmit axial compressive force from the first element to the threaded member or said adjacent part to be assembled.

According to an embodiment, the second element is axially movable with respect to the first element, between an axial stop carried by the first element and the stop member.

The stop member is in an embodiment urged towards the second element by said spring means bearing on the first element and is driven in translation along the axis against the spring means with respect to the first element under the influence of the second element as the threaded body is moved axially during screwing when the second element axially engages the threaded member or said adjacent part to be assembled.

Preferably said first element comprises a supporting cylinder enclosing the stop member, the releasable coupling means and the spring means. An end face of said supporting cylinder may be configured and arranged to engage said second element thereby to transmit said axial compressive force to the second element. Said enclosing is preferably in a substantially sealing manner with respect to the environment when the assembly is in the tightened condition.

The device being a nut and the stop member being axially movable with respect to the first element, the stop member is advantageously coupled for common rotation with a supporting cylinder accommodating the stop member and secured to the threaded body, there being rotation drive means between the stop member and the inner face of the cylinder, said rotation drive means allowing for axial movement of the stop member with respect to the cylinder.

Advantageously, the spring means are of the compression type, in particular of the wavy type, which is axially compact.

According to a second object of this invention, there is provided a unitary self-locking screwing attachment device for being part of an assembly having locking structure and for engaging a male threaded member of said assembly, the attachment device comprising:

a first element having a threaded body provided with a nut thread for thread engagement with said threaded member during screwing and unscrewing towards and away from a threaded condition, respectively; and a lock in turn comprising:
  a second element rotatably and captively supported onto said threaded body and provided with a locking feature to engage said locking structure at least when said assembly is in or close to the tightened condition;
  a stop member rotatably secured to the threaded body;
  a releasable coupling means arranged for releasably coupling the stop member and the second element for common rotation;
  spring means for resiliently activating said releasable coupling means;

wherein said releasable coupling means and said spring means are configured and arranged to allow relative rotation of said stop member and said second element in a screwing direction when a torque applied to said device exceeds a predetermined screwing torque threshold and to allow relative rotation of said stop member and said second element in an unscrewing direction when an unscrewing torque applied to said device exceeds a predetermined unscrewing torque threshold, and wherein said lock is arranged beyond a rear axial end of said nut thread with respect to the screwing direction.

In one embodiment, said releasable coupling means consists of a first and a second group of axially directed teeth, said first group secured to the stop member and said second group secured to the second element.

Preferably, the stop member and the spring means have generally annular shapes and are accommodated within a supporting cylinder belonging to the first element.

In a more specific, preferred embodiment, the first element has a hollow supporting cylinder and the spring means, the stop member and the releasable coupling means are accommodated within a chamber formed in the tightened condition radially between the threaded member and an inner face of the cylinder.

Preferably, the stop member is integrally secured to the first element, and the second element is mounted axially between the stop member and an axial stop secured to the first element. In an embodiment, the stop member is adjacent the threaded body and the spring means is axially between the second element and the axial stop.

In an embodiment, the stop member is integrally secured to the first element, and the second element is mounted axially between the stop member and an axial stop secured to the first element and wherein the axial stop comprises a plastically bent end lip of the cylinder which is secured to the first element.

In a first alternative embodiment, the first element has a clamping face for transmitting a clamping force into the assembly in the tightened condition, and wherein the lock and the clamping face are on either side of the thread of the threaded body. This embodiment is more particularly advantageous when the threaded member is a threaded tip with the locking structure provided on the threaded tip axially beyond the thread of the threaded tip. The clamping face may be at or beyond a front end of the thread of the threaded body, with respect to the screwing direction.

In a second alternative embodiment, the first element has a clamping face for transmitting a clamping force into the assembly in the tightened condition, and the clamping face is axially between the thread of the threaded body and the lock. This embodiment is more particularly advantageous for a nut to be screwed onto a thread of a support such as one pipe end-piece while the adjacent part to be secured is the other pipe end-piece and extends through the nut and is provided with the locking structure.

The locking feature is preferably a radially inner feature of the second element, especially to engage said locking structure being typically annular and provided axially beyond a thread of the threaded member, typically either on the threaded member or on the adjacent part to be assembled.

The locking feature is preferably adapted for cooperation with said locking structure being radially small enough to travel axially through the nut from the locking feature throughout the nut thread of the threaded body.

In one embodiment, said locking feature is a female polygonal formation.

The spring means are preferably of the compression type, in particular of the wavy type.

According to a third object, the invention provides an assembly comprising a support onto which is securely mounted a threaded member being a threaded tip, at least one adjacent part through which the tip extends, and a self-locking screwing attachment device according to the first or the second object, said attachment device being a nut adapted to be screwed onto the threaded tip thereby to fasten the adjacent part onto the support.

According to a fourth object, the invention provides an assembly comprising a support onto which is securely mounted a threaded member being a threaded tip having a male threading and said locking structure provided between the male threading and a free end of the threaded tip, at least one adjacent part through which the tip extends, and a self-locking screwing attachment device according to the second object, said attachment device being adapted to be screwed onto the threaded tip thereby to fasten the adjacent part onto the support.

According to a fifth object, the invention provides a pipe assembling device comprising a first pipe end-piece externally provided with a male thread and with a first end sealing surface, a second end-piece provided with a second end sealing surface and with a shoulder, said first and second end sealing surfaces being adapted to engage each other and seal a fluid communication between the end-pieces with respect to the outside, and a self-locking screwing attachment device according to the second object, wherein the clamping surface of the first element is adapted to engage the shoulder of the second-end-piece and to urge the sealing surfaces in sealing contact with each other as the nut is being screwed onto the male thread, and wherein the locking structure is provided on the second end-piece.

In one embodiment, the shoulder is axially between the second end sealing surface and the locking structure.

Advantageously, the locking structure is radially smaller than the self-locking screwing attachment device orifice from the locking feature throughout the thread, thereby to allow the self-locking screwing attachment device in the untightened condition to be axially removed from around the first end-piece.

In one embodiment of the fourth or fifth object, the locking structure is a male polygonal formation.

BRIEF DESCRIPTION OF THE FIGURES

The invention will be better understood upon reading the description that follows of two non-limiting embodiments of the invention and in light of the appended drawings wherein.

DETAILED DESCRIPTION

Generally in the following description, the screwing of the nut is mentioned along an axial direction X, which is coextensive to the longitudinal axis of the threaded tip cooperating with the nut. The words "front" and "back" used throughout the text to structurally describe the invention should be understood in connection with this axial direction, and more precisely with the direction of movement of the nut when it is screwed onto the tip (screwing forwardly, unscrewing rearwardly).

Figure 1:
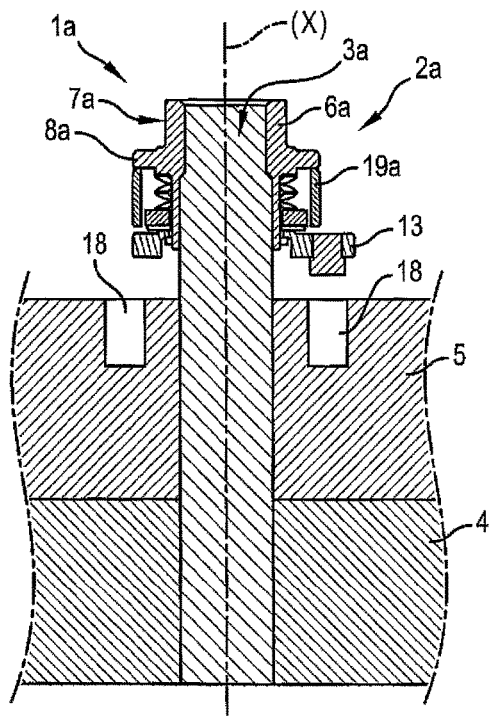
FIGS. 1 and 2 represent an assembly of two parts provided with a screwing coupling device according to a first embodiment of the invention, respectively in a preassembled configuration and in an assembled configuration.
Figure 2:
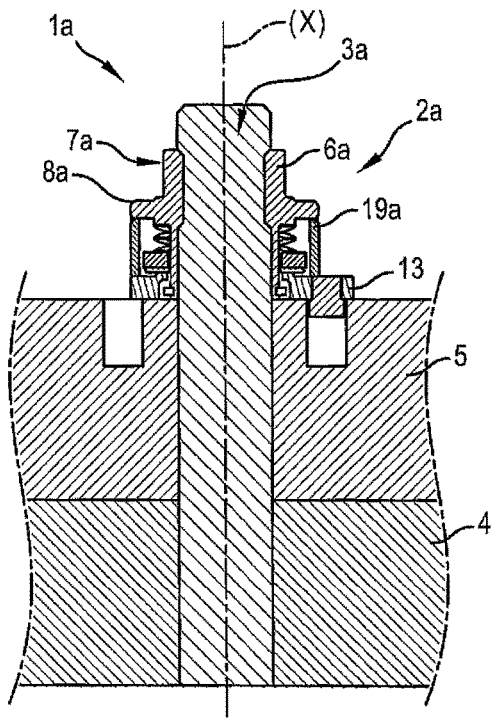

There is represented in FIGS. 1 and 2 a self-locking screwing attachment device is according to a first embodiment of the invention. This device includes a nut 2a screwed onto a threaded tip 3a (or strut) so as to ensure the attachment to each other of at least two parts, typically a supporting part 4 and an adjacent part 5, in the example represented. In this example, the threaded tip 3a is rigidly mounted in a bore of the supporting part 4. The adjacent part 5 has the tip 3a passing therethrough and is sandwiched between the supporting part 4 and the nut 2a. In an alternative not represented, the tip 3a can be provided with a shoulder resting against a face of the supporting part 4 on the opposite side to the thread of the tip 3a, so as to simultaneously sandwich the supporting part 4 and the adjacent part 5 between the shoulder and the nut 2a.

According to the invention, the nut 2a includes a first element 6a rotating relative to the tip 3a when screwing. In reference to FIGS. 1 to 3, this first element includes several sections that can be broken down from back to front into an area for rotatable engagement 7a by a screwing tool such as a wrench, a shoulder 8a formed on the periphery of the nut 2a, and a cylindrical part 9a, substantially extending the area for rotatable engagement 7a forwardly beyond the shoulder 8a. The area 7a has typically a prismatic external shape, for example a six-sided one. The first element includes an end-to-end through bore 10. A rear part 11 of the bore 10 is narrower and includes a thread 12 cooperating with that of the tip 3a when screwing.

The nut 2a includes a second element 13a having generally an annular shape located at a front end of the nut 2a. The second element 13a includes an internal shoulder 14a. The radially internal profile of the shoulder 14a is fitted around a front end of the cylindrical part 9a of the first element 6a and is retained forwardly by an axial stop 15a, typically an elastic ring.

As soon as the lug 17a is introduced into the housing 18, the second element 13a is rotatably engaged with the adjacent part 5, that is rotatably unmovable with the same. It is assumed in this case that the part 5 is itself rotatably unmovable with respect to the tip 3a. The second element 13a includes a radial extension 16a carrying a lug 17a extending axially in the screwing direction of the nut 2a, that is forwardly. The lug 17a is for being introduced into a housing 18 having a conjugated shape, for example a blind bore provided in the adjacent part 5. In the example illustrated in FIGS. 1 and 2, there are provided two housings 18 arranged at 180° around the axis X, preventing the second element 13a from being rotated one full rotation about the axis X before the lug 17a is positioned opposite the housing 18. Alternatively, a single housing could be enough.

Figure 3:
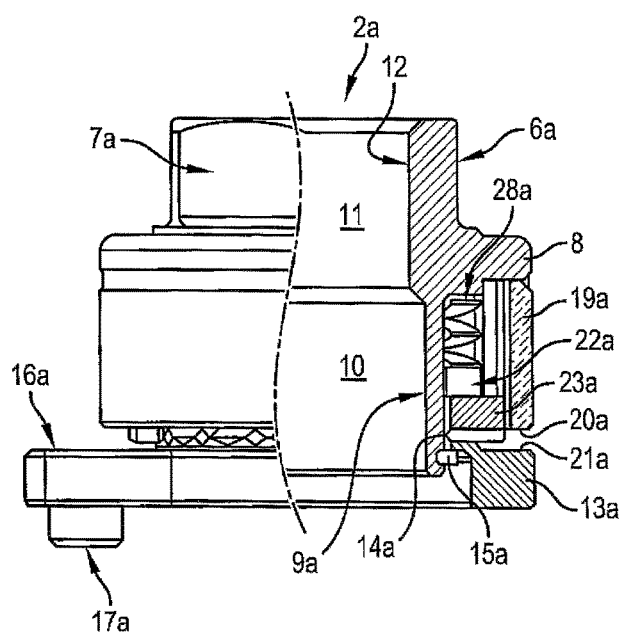
FIG. 3 represents an enlarged view of FIG. 1 with a partial cross-section along a longitudinal cross-section plane.
Figure 4:
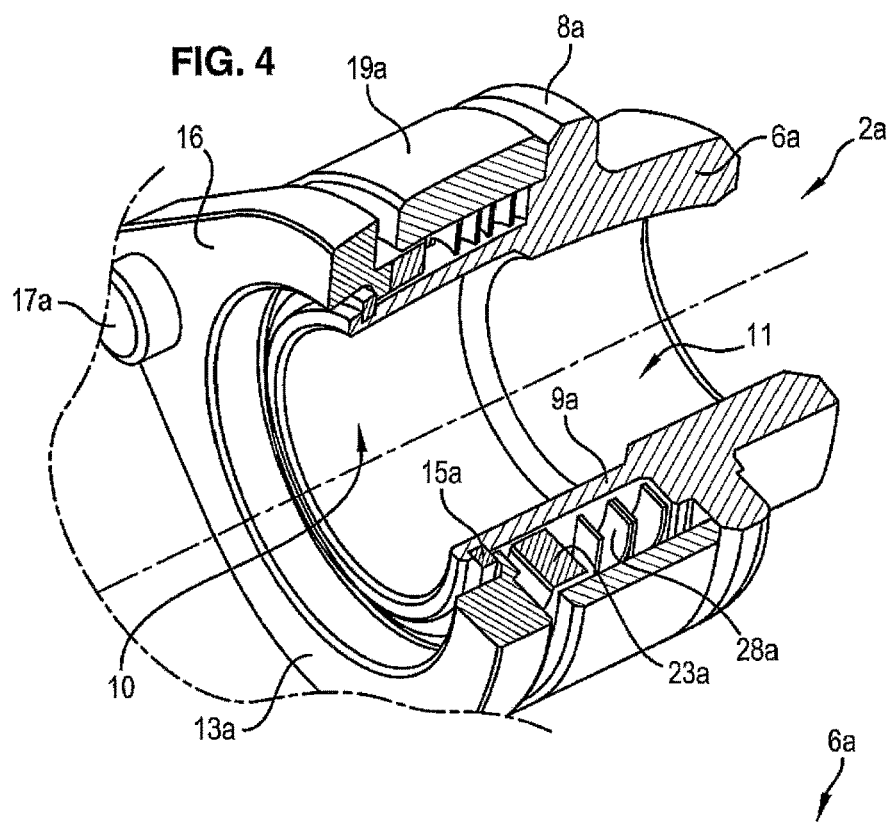
FIG. 4 represents a perspective view of the nut of FIG. 1 with one quarter cut away in the longitudinal direction.

As can be seen in FIG. 3, the nut 2a also includes a supporting cylinder 19a fastened at its back end to a front face of the shoulder 8a. A face of the front end of the cylinder 19a makes up a first clamping surface 20a for axially engaging a second clamping surface 21a located in front of the same on a back face of the second element 13a. The supporting cylinder 19a forms a spacer restricting the advancement of the first element 6a with respect to the second element 13a when the nut 2a is being screwed onto the tip 3a. The cylinder 19a is for example welded to the shoulder 8a. A substantially annular or cylindrical throat 22a is provided between the cylindrical part 9a and the supporting cylinder 19a which bound this throat internally and externally, respectively.

Figure 5:
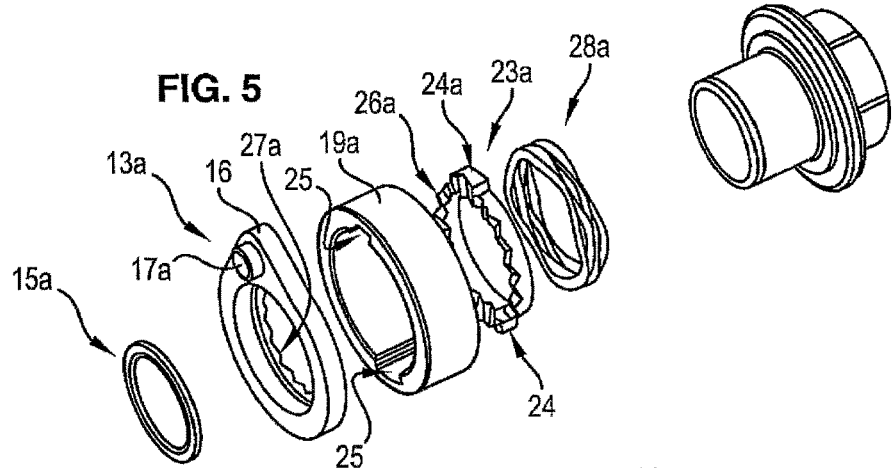
FIG. 5 represents an exploded view of the nut of FIG. 1.

The nut 2a also includes a stop member 23a having generally an annular shape introduced into the throat 20a. The stop member 23a is rotatably secured to the first element 6a. For that purpose, the stop member 23a includes at least one radial protrusion 24a, typically two protrusions 24a as represented in FIGS. 1 to 5. These protrusions 24a are introduced and axially slide in grooves 25 having conjugated shapes provided in the thickness of the supporting cylinder 19a (FIG. 5). These protrusions have for example dovetail shapes, the flared zone of which is the farthest from the axis X, these protrusions being introduced into respective grooves having also a trapezoidal cross-section. Such a trapezoidal shape ensures an optimum guidance of the stop member when axially moved into the throat 22a.

According to the invention, the nut 2a also includes releasable coupling means 26a, 27a, 28a consisting of two groups of axially directed teeth, fastened for a first group to the stop member 23a, and for the second group to the second element 13a. One group of teeth 26a is provided on a front annular face of the stop member 23a and another group of teeth 27a is provided on a back annular face of the second element 13a facing said front face. The teeth have a triangular configuration and have more precisely an isosceles shape, that is have faces directed towards the other group of teeth and are of the same oblique slope. The teeth 26a of the stop member 23a and the teeth 27A of the second element 13a have complementary profiles such that they are interpenetrable when biased by the return means 28a provided in the throat 22a, urging the stop member 23a towards the second element 13a.

The first group of teeth 26a of the stop member 23a is rotatably driven with the first element 6a upon screwing the nut 2a, whereas the second group of teeth 27a of the second element 13a is rotatably unmovable. During this relative rotation between both groups of teeth, the latter are alternately in an interpenetration configuration and a tip to tip configuration. The passage from one configuration to the other is performed by a relative sliding of the respective adjacent faces of both groups of teeth. The stop member 23a thereby performs translations along the axis X alternately rearwardly and forwardly when screwing the nut 2a, this being similar to an oscillation movement. Each translation is performed on a stroke corresponding to the height of the teeth, the distance separating the tip of one tooth from the trough between two teeth, projected on the axial direction.

Figure 6:
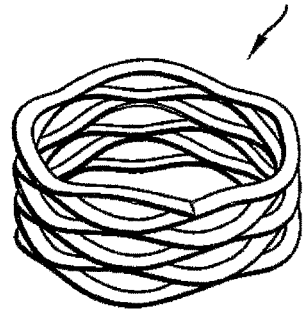
FIG. 6 represents a view of the spring integrated to the nut of FIG. 1.

The return means 28a are typically formed by a wavy compression spring, as illustrated in FIG. 6, working on a relatively small axial stroke, induced by alternated translations of the stop member 23a. The spring 28a rests on the one hand onto a shoulder of the first element 6a located at the bottom of the throat 22a, and on the other hand on a back face of the stop member 23a.

Screwing the nut 2a onto the tip 3a is performed the following way: as illustrated in FIG. 1, the nut is presented at the end of the threaded tip and then screwed thereto using an adapted wrench rotatably engaging the nut. At the beginning of the screwing, the second element is freely rotatable, and then moves closer to the adjacent part 5. When the nut 2a is being screwed, the second element 13a rotates about the axis X until the lug contacts the adjacent part 5. A further screwing of the nut further rotates the second element 13a, until the lug 17a clings onto the first of the housings 18 located on its trajectory, in view of the axial forward thrust. This indexing of the lug onto the mouth of the housing is automatically operated and generates a sensory effect perceived by the operator when screwing. The lug 17a once in this position, will then penetrate the housing 18 as the screwing proceeds further and the nut advances towards the adjacent part 5. The second element 13a is then rotatably unmovable with respect to the other parts of the nut 2a. Any further rotation of the first element 6a causes two effects: on the one hand, the first element 6a will advance in translation along the axis X towards the second element 13a, as long as there is nothing to stop this advancement. On the other hand, the coupling means are biased by the relative sliding between both groups of teeth 26a, 26b, which rotate with respect to each other at the same time as an oscillation of the stop member 23a is exerted against the thrust exerted by the return means 28a. Thrusts and releases are alternately performed in the contact between both groups of teeth. This results in a braking effect also called self-locking, preventing the nut 2a from being importantly unscrewed, since the same thrust and release phenomenon between the teeth is present when unlocking. To overcome the thrust of the spring, a rotation torque should be applied to the first element 6a, which is higher than a given threshold, so as to generate either locking, or unlocking. The screwing proceeds until the second element 13a comes to press against the adjacent part 5 and the supporting cylinder 19a comes into contact with the second element 13a, by their respective clamping surface 20a, 21a, as shown in FIG. 2. A clamping torque is finally applied to the first element 6a, which is reflected by a suitable clamping directly exerted between the supporting cylinder 19a and the second element 13a.

Figure 7:
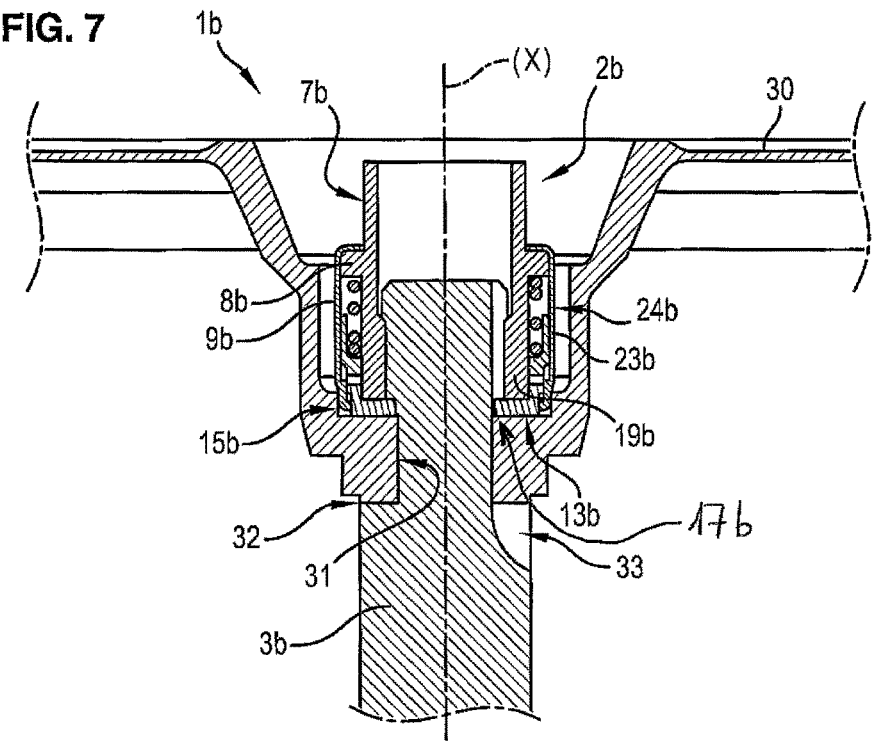
FIG. 7 represents an assembly of one part onto a threaded tip provided with a coupling device according to a second embodiment of the invention.
Figure 8:
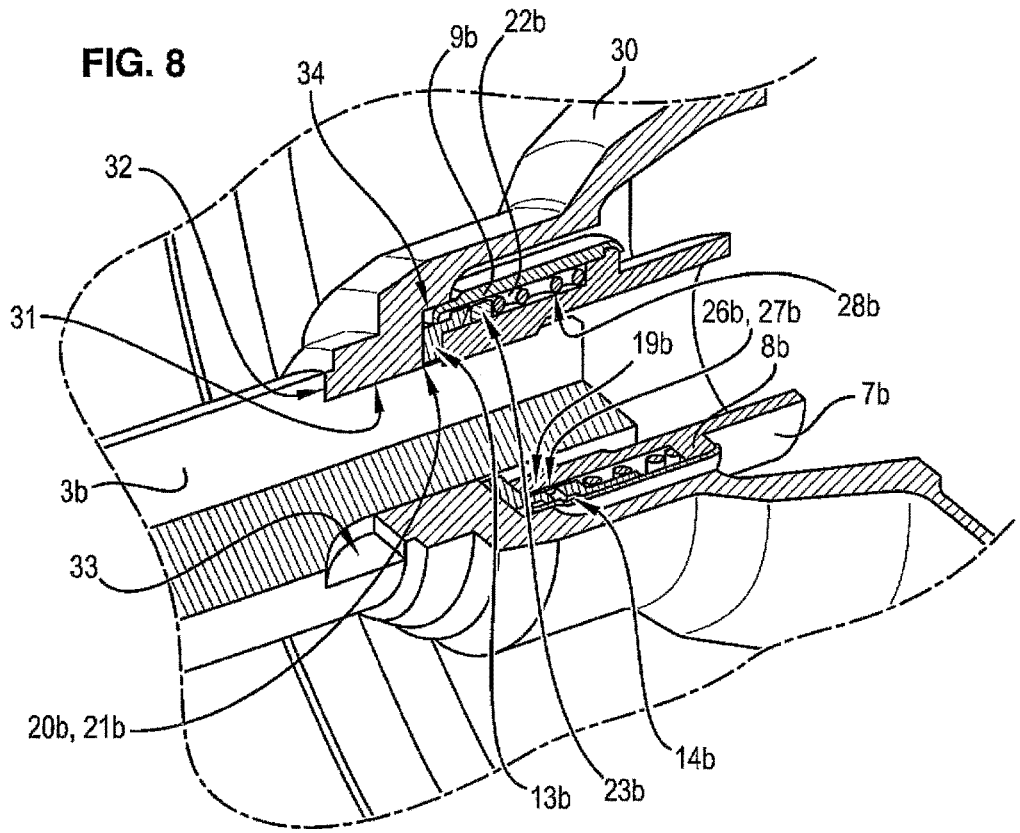
FIG. 8 represents a perspective view of the assembly of FIG. 7, with one quarter cut away in the longitudinal direction.

A second embodiment of the invention is presented in FIGS. 7 and 8 only with respect to the differences from the first embodiment. Elements having references with the same base number (for example 2a and 2b) have identical technical functions or effects in both embodiments.

In this second embodiment, the assembly is made between a rotating element 30 such as a pulley, a wheel, etc. and a tip 3b. The rotating element 30 includes a hub provided with a centre bore 31 enabling it to be fitted onto the tip end, to the point of coming to rest onto a shoulder 32 of the tip 3b. An anti-rotation device is provided between the rotating element 30 and the tip 3b, for example an internal radial protrusion in the bore of the rotating element, forming a key, introduced into a longitudinal groove 33 formed on the end of the tip 3b.

A first element of the nut 2b includes several sections which can be broken down from back to front in an area for rotatable engagement 7b using an adapted tool, a peripheral shoulder 8b and a supporting cylinder 19b.

The supporting cylinder 19b extends the area for rotatable engagement 7b beyond the peripheral shoulder 8b forwardly, that is in the screwing direction of the nut 2b.

The nut also includes a cover 9b having generally a cylindrical shape fastened to the peripheral shoulder 8b, and extending forwardly to a front end 34. A throat 22b having a substantially cylindrical shape is bounded on the one hand internally by the supporting cylinder 19b, and on the other hand externally by the cover 9b.

The nut includes a stop member 23b having generally an annular shape, introduced into the throat 22b. The stop member 23b includes rotating stops means consisting of at least one radial protrusion 24b axially sliding in a groove having a conjugated shape provided in the thickness of the cover 9b. This protrusion can for example have generally a dovetail shape having a flared part away from the axis X, ensuring an optimum guidance of the stop member 23b with respect to the cover 9b.

In this embodiment, the second element 13b has generally an annular shape having an external shoulder the radially external profile 14b of which is sandwiched between an axial stop 15b and the stop member 23b. The axial stop 15b consists of a shoulder or narrowed portion, in particular made by crimping, extending radially towards the axis X, so as to trap the second element 13b into the throat 22b.

As in the first embodiment, the second element 23b includes rotating stop means with respect to the first element 6b, consisting of at least one radially internal protrusion penetrating a longitudinal groove provided to the tip 3b, so as to set a key type link. The groove can advantageously be the groove 33 rotatably locking the rotating element 30.

Coupling means 26b, 27b, 28b consist of a first group of teeth 26b provided on a front annular face of the stop member 23b, and a second group of teeth 27b provided on a back annular face of the second element 13b.

A compression spring 28b such as a coiled spring is provided in the throat 22b, and rests on a bottom of the throat 22b to push the stop member 23b towards the second element 13b, so as to generate the interpenetration of the teeth. In an alternative not shown, a wavy spring is also suitable.

As in the first embodiment, direct clamping surfaces are provided between two constituent elements of the nut 2b, that is a front annular face of the supporting cylinder 19b, and a back annular face of the second element 13b. The supporting cylinder 19b forms a spacer as in the first embodiment, by restricting the advancement of the first element 6b to the second element 13b, and allows a direct transmission of the clamping force between the first element and the second element being rotatably unmovable.

The operating principle of this second embodiment is similar to the first embodiment and will not be described in more details.

Schematically, the first and second embodiments are especially different in that:
the supporting cylinder is located outside the coupling means in the first embodiment, whereas it is located inside the coupling means in the second embodiment,
the rotating stop of the second element is performed via the adjacent part in the first embodiment whereas it is directly performed on the threaded tip in the second embodiment,
the axial stop of the second element is performed by a cylindrical part and an elastic ring in the first embodiment whereas it is performed by a narrowed part of the cover in the second embodiment.

There is represented in FIGS. 9-13 a pipe assembling device including a self-locking attachment device according to a third embodiment of the invention.

The pipe assembling device comprises a first tubular pipe end-piece 101 provided with a first annular end sealing surface 111 and a second tubular pipe end-piece 102 provided with a second annular end sealing surface 112. At its end remote from the respective end sealing surface each pipe end-piece is integral or otherwise sealingly connected with a respective pipe element (not shown). The end sealing surfaces 111 and 112 are adapted to engage each other and to seal the fluid communication of the two end-pipes with each other with respect to the outside when the end-pieces are axially urged against each other. In this embodiment, the sealing end surfaces 111 and 112 are of a classical design forming a substantially conical fit with each other.

The self-locking attachment device 1c according to the third embodiment is adapted to perform and secure the above described axial sealing engagement of both sealing end surfaces 111 and 112 with each other.

To this end, the first end-piece 101 is provided with an external thread—or male thread—116c substantially adjacent the first end sealing surface 111. The second end-piece 102 is provided with an external shoulder 114c substantially adjacent the second end sealing surface 112. The shoulder 114c faces away from the first end-piece 101.

The attachment device is includes a nut 2c which is slidingly mounted around the second end-piece 102 starting from the rear end of the second end-piece. The nut 2c has an internal nut thread which can be screwed onto the thread 116c of the first end-piece 101, and a radially internal clamping face 62c which is provided at the rearward end of the nut thread with respect to the screwing direction of the nut. The clamping face 62c is adapted to axially engage the shoulder 114c of the second end-piece 102 during screwing of the nut thereby to urge the two sealing surfaces 111 and 112 against each other as described above.

The nut 2c includes a first element 6c rotating relative to the two end-pieces 101 and 102 during screwing. The first element includes several sections that can be broken down from back to front into a body part or threaded body 126c with the nut thread 12c therein, an area for rotatable engagement 7c by a screwing tool such as a wrench, a shoulder 8c formed on the periphery of the nut 2c, and a cylindrical part 9c which has a cylindrical inner surface formed radially inside the area 7c. The cylindrical part 9c is farther from the first end-piece 101 than the threaded body 126c. The area 7c has typically a prismatic external shape, for example a six-sided one. The first element includes an end-to-end through bore 10c. The rear part 11c of the bore 10c is radially narrower than the thread 12c.

The inner cylindrical surface of the cylinder 7c and the outer surface of the second pipe end-piece 102 define together an annular chamber 22c between them. The clamping face 62c is a face of the first element 6c. In the embodiment shown, the clamping face 62c is a front face of an inner collar of the first element 6c, the rear face of the collar being a front end face 122 of chamber 22c.

The nut 2c includes a second element 13c having generally an annular shape located within chamber 22c. The second element 13c is rotatable with respect to the first element 6c and especially with respect to the threaded body 126c, and moreover has a limited axial mobility with respect thereto. The second element 13c is provided with a locking feature 17c which is in this embodiment a polygonal, more particularly hexagonal female formation on its central bore. The locking feature 17c is adapted to engage a corresponding locking structure 18c provided on the second end-piece 102 behind the shoulder 114c with respect to the screwing direction of the nut. In this embodiment the locking structure 18c is a male polygonal, more particularly hexagonal formation which is complementary of the locking feature 17c.

Figure 13:
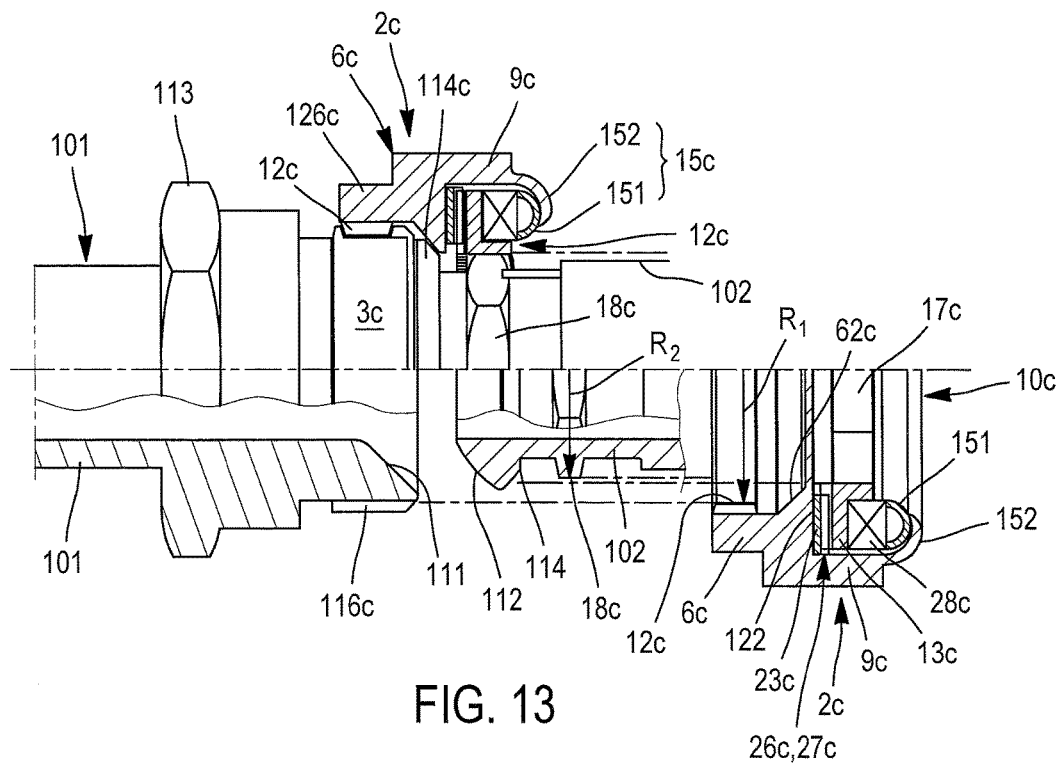
FIG. 13 is an axial section of the assembly of FIG. 12, the lower half section prior to mounting of the attachment device and the upper half section once mounted and tightened.

The locking feature 17c and the locking structure 18c are axially positioned thereby to mesh with each other when the clamping face 62c engages the shoulder 114c, as shown in the upper part of FIG. 13.

When the locking structure and the locking feature intermesh, the second element 13c is locked onto the second end-pipe 102 so that further rotation of the first element 6c needs relative rotation between the first element 6c and the second element 13c.

The nut 2c also includes a stop member 23c having generally an annular shape introduced into chamber 22c. The stop member 23c is rotatably secured to the first element 6c. In this embodiment the stop member 23c is even rigidly secured to the first element by being force fitted or otherwise welded to the first element 6c.

In the example the stop member is adjacent and secured against a front shoulder 122 limiting the chamber 22c at its front end.

The nut 2c also includes releasable coupling means 26c, 27c, 28c consisting of two groups of axially directed teeth, fastened for a first group to the stop member 23c, and for the second group to the second element 13c. One group of teeth 26c is provided on a rear annular face of the stop member 23c and another group of teeth 27c is provided on a front annular face of the second element 13c facing said rear face of the stop member 23c. The teeth have a triangular configuration and have more precisely an isosceles shape, i. e. have planar side faces with a same oblique slope on both sides of each tooth. The teeth 26c of the stop member 23c and the teeth 27c of the second element 13c have complementary profiles such that they are capable of intermeshing when biased axially towards each other by return means 28c provided in the chamber 22c, urging the second element 13c towards the stop element 23c.

The return means 28c are mounted axially between the second element 13c and an axial stop 15c provided at the rear end of the annular chamber 22c. The axial stop 15c comprises an end lip 152 of the cylinder which is bent radially inwardly, maintaining a washer 151 abutting the rear end of the return means 28c. The mounting of the nut is easy because it only needs to secure the stop member 23c in the chamber 22c, then to stack in the chamber 22c the second element 13c, the return means 28c and the washer 151, and then to impart the lip 152 a permanent bending deformation thereby to captively and permanently hold every components of the lock within the chamber 22c.

The above described limited axial mobility of the second element 13c is allowed by the return means 28c between a locking position in which the second element 13c inter-meshes with the stop member 23c, and an unlocking position in which the return means are more stressed and the teeth of both groups 26c and 27c are sufficiently disengaged of each other to allow rotation of the first element 6c together with the stop member 23c while the second element 13c is blocked by a mutual engagement of the locking feature 17c and the locking structure 18c.

The return means 28c bias the second element 13c into the locking position. If a sufficient torque is applied to the nut 2c, the first group of teeth 26c of the stop member 23c is rotatably driven with the first element 6c upon screwing the nut 2c, whereas the second group of teeth 27c of the second element 13c is rotatably unmovable. During this relative rotation between both groups of teeth, the latter are alternately in an interpenetration configuration and a tip to tip configuration. The passage from one configuration to the other is performed by a relative sliding of the respective adjacent faces of both groups of teeth. The second element 13c thereby performs translations along the axis X alternately rearwardly and forwardly as the nut 2c is being rotated, this being similar to an oscillation movement. Each translation is performed on a stroke corresponding to the height of the teeth, substantially the distance separating the tip of one tooth from the trough between two teeth, projected on the axial direction.

Figure 9:
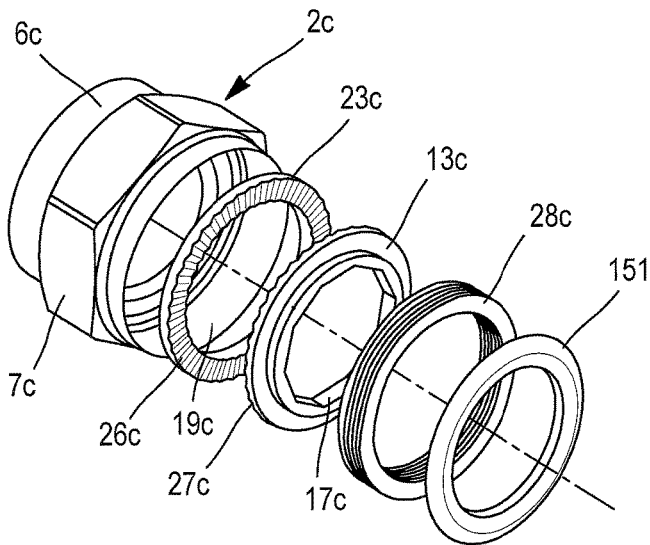
FIG. 9 represents an exploded perspective view of a third embodiment of the self-locking attachment device according to the invention.
Figure 10:
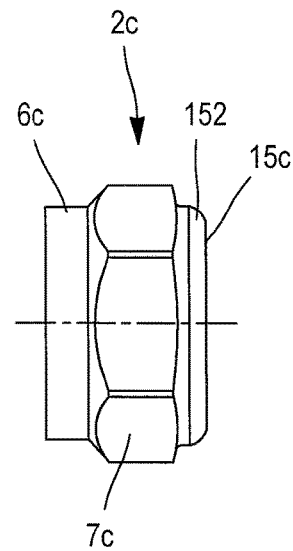
FIG. 10 is an elevational view of the device of FIG. 9.

The return means 28c are of the compression type, typically formed by a wavy compression spring, as illustrated in FIG. 9, working on a relatively small axial stroke, induced by alternated translations of the second element 13c.

Figure 11:
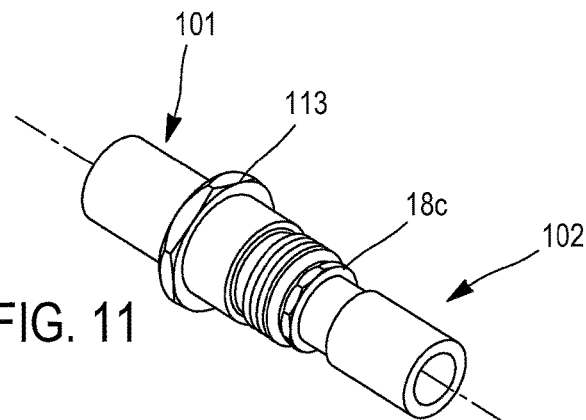
FIG. 11 represents a perspective view of a pipe assembly according to the invention, using the third embodiment of the attachment device, in a state prior to mounting of the attachment device onto the pipe end-pieces.
Figure 12:
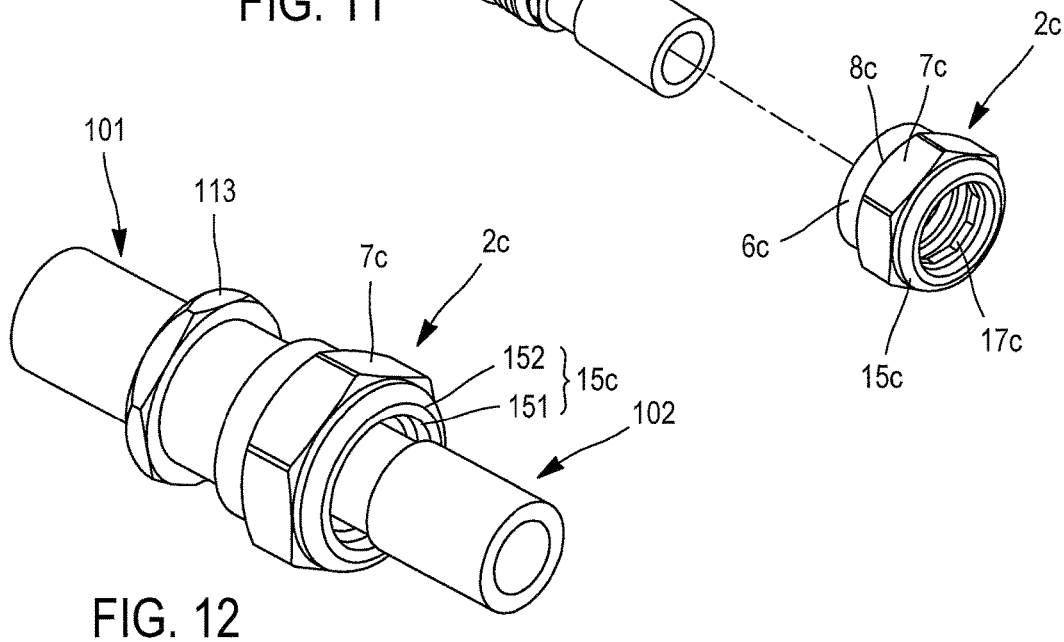
FIG. 12 is a view similar to FIG. 11 but after mounting and tightening of the attachment device, and at a larger scale.

Screwing the nut 2c onto the thread 116c is performed the following way: as illustrated in FIG. 11, the nut is presented at or near the rear end of the second pipe end piece 102 and then screwed thereto using an adapted wrench rotatably engaging the nut, while preferably a second wrench is used for exerting a counter-torque onto a polygonal formation 113 of the first pipe end-piece 101. At the beginning of the screwing, the second element 13c may be freely rotatable with respect to the second pipe end-piece 102 and thus freely driven in rotation with the nut by the stop member 23c. At a moment the locking feature 17c fits around the locking structure 18c, this stopping the rotation of the second element 13c. This indexing of the second element 13c is automatically operated and generates a sensory effect perceived by the operator when screwing. Further rotation of the first element 6c causes two effects: on the one hand, the first element 6c will advance in translation along the axis X towards the first pipe end-piece 101 until the clamping face 62c abuts the shoulder 114c. On the other hand, both groups of teeth 26c, 27c rotate with respect to each other at the same time as an oscillation of the second element 13c occurs under the bias exerted by the return means 28c. Thrusts and releases are alternately performed in the contact between both groups of teeth. This results in a braking effect also called self-locking, preventing the nut 2c from being importunately unscrewed, since the same thrust and release phenomenon between the teeth is present during unscrewing. To overcome the thrust of the spring, a rotation torque should be applied to the first element 6c, which is higher than a given threshold, defined by the strength of the return means 28c and by the slope of the teeth side faces and their mutual friction characteristics.

The thread crest radius R1 (FIG. 13, lower half) of the thread 12c of the nut 2c is greater than the greatest of the radii of the second pipe end-piece 102 so that the nut 2c, when disengaged from the thread 1116c of the first pipe end-piece 101 can be axially removed backwards for good work access at the junction between the two pipe end-pieces. This is also permitted by the greatest radius R2 of the locking structure 18c being smaller than every inner radius of the nut 2c forwardly of the locking feature 17c.

More generally, the nut is able to slide forward over the second pipe end-piece 102 from a position fully behind the locking structure 18c up to the position of beginning of screwing and then during screwing up to the tightened condition. This will be appreciated for example by comparing the lower and the upper part of FIG. 13.

In the embodiment of FIG. 9-13, the clamping face 62c is in the nut bore and axially between the nut thread 12c and the lock comprising the stop member 23c, the second element 13c, the return means 28c and the axial stop 15c.

The embodiment of FIG. 14 will be described only as to its differences with the foregoing ones. The reference numerals are much the same as those of the foregoing embodiments, but followed by "d" instead of "a" for the first embodiment or "c" for the third embodiment.

Figure 14:
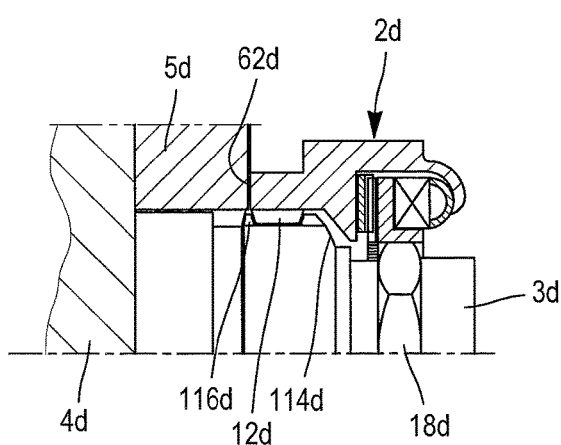
FIG. 14 is an axial half sectional view of another embodiment of the assembly, implementing a fourth embodiment of the attachment device.

The assembly of FIG. 14 is similar to that of FIG. 1 in that a self-locking attachment device 1d is used to secure a part 5d against a support 4d provided with a threaded tip 3d extending throughout a bore of the part 5d. The attachment device is a nut 2d engaging a thread 116d exhibited by the tip 3d on its portion projecting from the part 5d away from support 4d. The nut 2d has a clamping face 62d which presses against the part 5d so as to tightly compress the part 5d between the clamping face 62d and the support 4d while the threaded tip 3d is under an elongation stress.

The nut 2d is very similar to the nut 2c of the foregoing embodiment, except that the clamping face 62d is now on a front end of the first element 6d. This clamping face 62d is different of that of the embodiment of FIG. 1 in that it directly engages the adjacent part (5d) of the assembly and no longer through the second element (13a of FIG. 1).

According to the new location of the clamping face 62d by comparison with the embodiment of FIGS. 9-13, the nut thread 12d is now located axially between the clamping face 62d and the lock.

The threaded tip 3d is extended beyond its thread 116d with a shoulder 114d followed by a radially narrower portion provided with the locking structure 18d. It should be noted that the locking function is now between the nut 2d and the threaded tip 3d, instead of between the nut 2c and the part 102 to be secured in the embodiment of FIGS. 9-13.

The nut 2d is axially extractable from the threaded tip 3d, with the thread 12d travelling axially around the extension of the tip 3d and especially around the locking structure 18d.

The operation of the nut 3d is much similar to that of the nut 3c, except for the already mentioned differences regarding the location of the clamping contact and the locking with respect to the threaded part 3d, 4d instead of with the part to be secured 5d.

The embodiment of FIG. 15 will now be described only as to its differences over the embodiment of FIG. 14.

Figure 15:
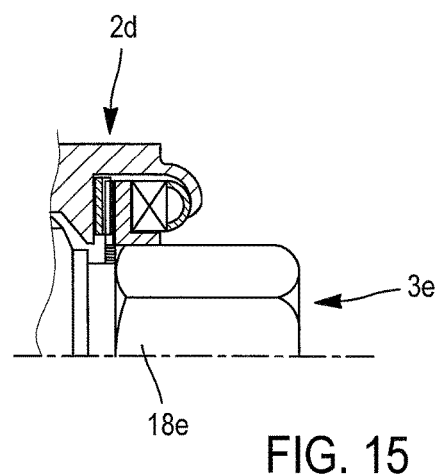
FIG. 15 represents a fifth embodiment in a view similar to part of FIG. 14.

In the embodiment of FIG. 15, the locking structure 18e is extended axially towards the rear with reference to the screwing direction of the nut 2d. Accordingly, when the nut is in the tightened condition as shown, a portion of the locking structure 18e is exposed axially behind the nut 2d. This allows the use of a tool, typically a wrench, engaging the apparent portion of the locking structure 18e to impart a counter-torque to the threaded tip 3e during screwing or unscrewing of the nut 2d.

More generally, there is described a strut and nut or a bolt and nut or the like fastening device, in which both a screwing—or unscrewing—torque and a reaction counter-torque can be exerted from a same side of the part such as 5d to be secured, thanks to a gripping formation, typically a polygonal formation such as 18e, on the threaded male element such as 3e. The male thread is axially between the gripping formation and the part, such as 5d, to be clamped by the nut. Advantageously the gripping formation has two regions, one for exerting the counter-torque as just described, and another one closer to the male thread, to be a locking structure for a self-locking nut having an element provided with a locking feature adapted to cooperate with the locking structure for locking the element against rotation with respect to the male thread when the nut is caused to rotate.

Of course, the invention is not restricted to the means just described and includes all and any technical equivalents.

What is claimed is:

1. A unitary self-locking screwing attachment device for joining a first threaded member with a second member, at least one of the first or second members having locking structure, the attachment device comprising:
   a first element having a threaded body for thread engagement with the first threaded member during screwing and unscrewing towards and away from a tightened condition, respectively; and
   a lock comprising:
      a second element rotatably and captively supported onto said threaded body and provided with a locking feature that engages the locking structure at least when the assembly is in or close to the tightened condition;
      a stop member secured for common rotation with said threaded body;
      a releasable coupling means arranged for releasably coupling said stop member and said second element for common rotation; and
      spring means for resiliently activating said releasable coupling means;
   wherein said releasable coupling means and said spring means are configured and arranged to allow relative rotation of said stop member and said second element in a screwing direction when a torque applied to the attachment device exceeds a predetermined screwing torque threshold and to allow relative rotation of said stop member and said second element in an unscrewing direction when an unscrewing torque applied to the attachment device exceeds a predetermined unscrewing torque threshold;
   wherein said stop member and said spring means have generally annular shapes and are accommodated within a supporting cylinder belonging to said threaded body of said first element; and
   wherein said first element has a hollow supporting cylinder and wherein said spring means, said stop member and said releasable coupling means are accommodated within a chamber formed in the tightened condition radially between the threaded member and an inner face of said cylinder.

2. The device according to claim 1, wherein said releasable coupling means comprises a first and a second group of axially directed teeth, said first group secured to said stop member and said second group secured to said second element.

3. The device according to claim 1, wherein the device is a nut and the threaded member includes a male thread extending along a screwing axis and onto which a thread of the nut is screwed and unscrewed.

4. The device according to claim 3, wherein said stop member is axially movable with respect to said first element and is coupled for common rotation with a supporting cylinder, the device further comprising rotation drive means between said stop member and an inner face of said cylinder, said rotation drive means allowing for axial movement of said stop member with respect to said cylinder.

5. The device according to claim 1, wherein said stop member is rigidly secured to said first element, wherein said second element is mounted axially between said stop member and an axial stop secured to said first element and wherein said axial stop comprises a plastically bent end lip of said cylinder which is secured to said first element.

6. The device according to claim 1, wherein said locking feature is a radially inner feature of said second element.

7. The device of claim 6, wherein the attachment device is a nut and said locking feature is to engage the locking structure being annular and provided axially beyond a thread of the threaded member.

8. The device of claim 6, wherein said locking feature is a female polygonal formation.

9. The device according to claim 1, wherein said second element is axially movable with respect to said first element and is configured and arranged to be axially clamped between said first element and the threaded member or a part to be assembled, and to transmit axial compressive force from said first element to the threaded member or an adjacent part to be assembled.

10. The device according to claim 9, wherein said stop member is urged towards said second element by said spring means bearing on said first element and is driven in translation along a screwing axis against said spring means with respect to said first element under the influence of said second element as said threaded body is moved axially during screwing when said second element axially engages said threaded member or the adjacent part to be assembled.

11. The device according to claim 9, wherein an end face of said supporting cylinder is configured and arranged to engage said second element thereby to transmit the axial compressive force to said second element.

12. The device according to claim 11, wherein said supporting cylinder encloses said stop member, said releasable coupling means, and said spring means in a substantially sealing manner with respect to the environment when the assembly is in the tightened condition.

13. The device according to claim 1, wherein said second element is axially movable with respect to said first element, between an axial stop carried by said first element and said stop member.

14. The device of claim 1, wherein said spring means is of the compression type.

15. The device according to claim 1, wherein said stop member is adjacent said threaded body and said spring means is axially between the second element and an axial stop secured to said first element.

16. The device according to claim 1, wherein said first element has a clamping face for transmitting a clamping force into the assembly in the tightened condition, and said clamping face is axially between a thread of said threaded body and said lock.

17. The device of claim 1, wherein said locking feature is adapted for cooperation with said locking structure being radially small enough to travel axially through the nut from said locking feature throughout a thread of said threaded body.

18. A unitary self-locking screwing attachment device for being part of an assembly having locking structure and for engaging a threaded member of the assembly, the attachment device comprising:
a first element having a threaded body for thread engagement with the threaded member during screwing and unscrewing towards and away from a tightened condition, respectively; and
a lock comprising:
a second element rotatably and captively supported onto said threaded body and provided with a locking feature that engages the locking structure at least when the assembly is in or close to the tightened condition;
a stop member secured for common rotation with said threaded body;
a releasable coupling means arranged for releasably coupling said stop member and said second element for common rotation; and
spring means for resiliently activating said releasable coupling means;
wherein said releasable coupling means and said spring means are configured and arranged to allow relative rotation of said stop member and said second element in a screwing direction when a torque applied to the attachment device exceeds a predetermined screwing torque threshold and to allow relative rotation of said stop member and said second element in an unscrewing direction when an unscrewing torque applied to the attachment device exceeds a predetermined unscrewing torque threshold;
wherein said releasable coupling means comprises a first and a second group of axially directed teeth, said first group secured to said stop member and said second group secured to said second element;
wherein the device is a nut and the threaded member includes a male thread extending along a screwing axis and onto which a thread of the nut is screwed and unscrewed; and
wherein said first element has a hollow supporting cylinder and wherein said spring means, said stop member and said releasable coupling means are accommodated within a chamber which, in the tightened condition, is radially bounded inwardly by the threaded member and outwardly by an inner face of said cylinder.

19. The device according to claim 18, wherein said releasable coupling means comprises a first and a second group of axially directed teeth, said first group secured to said stop member and said second group secured to said second element.

20. The device according to claim 18, wherein said stop member is adjacent said threaded body and said spring means is axially between the second element and said axial stop.

21. The device according to claim 18, wherein said stop member is rigidly secured to said first element, wherein said second element is mounted axially between said stop member and an axial stop secured to said first element and wherein said axial stop comprises a plastically bent end lip of said cylinder which is secured to said first element.

22. The device according to claim 18, wherein said first element has a clamping face for transmitting a clamping force into the assembly in the tightened condition, and said clamping face is axially between a thread of said threaded body and said lock.

23. The device according to claim 18, wherein said locking feature is a radially inner feature of said second element.

24. The device of claim 23, wherein the attachment device is a nut and said locking feature is to engage the locking structure being annular and provided axially beyond a thread of the threaded member.

25. The device of claim 24, wherein said locking feature is adapted for cooperation with said locking structure being radially small enough to travel axially through the nut from said locking feature throughout a thread of said threaded body.

26. The device according to claim 23, wherein said locking feature is a female polygonal formation.

27. The device according to claim 18, wherein said second element is axially movable with respect to said first element, between an axial stop carried by said first element and said stop member.

28. A unitary self-locking screwing attachment device for being part of an assembly having locking structure and for engaging a threaded member of the assembly, the attachment device comprising:
- a first element having a threaded body for thread engagement with the threaded member during screwing and unscrewing towards and away from a tightened condition, respectively; and
- a lock comprising:
- a second element rotatably and captively supported onto said threaded body and provided with a locking feature that engages the locking structure at least when the assembly is in or close to the tightened condition;
- a stop member secured for common rotation with said threaded body;
- a releasable coupling means arranged for releasably coupling said stop member and said second element for common rotation; and
- spring means for resiliently activating said releasable coupling means;
- wherein said releasable coupling means and said spring means are configured and arranged to allow relative rotation of said stop member and said second element in a screwing direction when a torque applied to the attachment device exceeds a predetermined screwing torque threshold and to allow relative rotation of said stop member and said second element in an unscrewing direction when an unscrewing torque applied to the attachment device exceeds a predetermined unscrewing torque threshold; and
- wherein said stop member is rigidly secured to said first element, and wherein said second element is mounted axially between said stop member and an axial stop secured to said first element.

29. The device according to claim 28, wherein said stop member is adjacent said threaded body and said spring means is axially between the second element and said axial stop.

30. The device according to claim 28, wherein said releasable coupling means comprises a first and a second group of axially directed teeth, said first group secured to said stop member and said second group secured to said second element.

31. The device according to claim 28, wherein the device is a nut and the threaded member includes a male thread extending along a screwing axis and onto which a thread of the nut is screwed and unscrewed.

32. The device according to claim 28, wherein said stop member and said spring means have generally annular shapes and are accommodated within a supporting cylinder belonging to said first element.

33. The device according to claim 28, wherein said first element has a hollow supporting cylinder and wherein said spring means, said stop member and said releasable coupling means are accommodated within a chamber which, in the tightened condition, is radially bounded inwardly by the threaded member and outwardly by an inner face of said cylinder.

34. A unitary self-locking screwing attachment device for being part of an assembly having locking structure and for engaging a threaded member of the assembly, the attachment device comprising:
- a first element having a threaded body for thread engagement with the threaded member during screwing and unscrewing towards and away from a tightened condition, respectively; and
- a lock comprising:
- a second element rotatably and captively supported onto said threaded body and provided with a locking feature that engages the locking structure at least when the assembly is in or close to the tightened condition;
- a stop member secured for common rotation with said threaded body;
- a releasable coupling means arranged for releasably coupling said stop member and said second element for common rotation; and
- spring means for resiliently activating said releasable coupling means;
- wherein said releasable coupling means and said spring means are configured and arranged to allow relative rotation of said stop member and said second element in a screwing direction when a torque applied to the attachment device exceeds a predetermined screwing torque threshold and to allow relative rotation of said stop member and said second element in an unscrewing direction when an unscrewing torque applied to the attachment device exceeds a predetermined unscrewing torque threshold; and
- wherein said first element has a clamping face for transmitting a clamping force into the assembly in the tightened condition, and said clamping face is axially between a thread of said threaded body and said lock.

35. The device according to claim 34, wherein said releasable coupling means comprises a first and a second group of axially directed teeth, said first group secured to said stop member and said second group secured to said second element.

36. The device according to claim 34, wherein the device is a nut and the threaded member includes a male thread extending along a screwing axis and onto which a thread of the nut is screwed and unscrewed.

37. The device according to claim 34, wherein said locking feature is a radially inner feature of said second element.

38. The device of claim 37, wherein the attachment device is a nut and said locking feature is to engage the locking structure being annular and provided axially beyond a thread of the threaded member.

39. The device of claim 38, wherein said locking feature is adapted for cooperation with said locking structure being radially small enough to travel axially through the nut from said locking feature throughout a thread of said threaded body.

40. The device of claim 37, wherein said locking feature is a female polygonal formation.

41. The device according to claim 34, wherein said second element is axially movable with respect to said first element, between an axial stop carried by said first element and said stop member.

42. A unitary self-locking screwing attachment device for being part of an assembly having locking structure and for engaging a threaded member of the assembly, the attachment device comprising:
- a first element having a threaded body for thread engagement with the threaded member during screwing and unscrewing towards and away from a tightened condition, respectively; and
- a lock comprising:
  - a second element rotatably and captively supported onto said threaded body and provided with a locking feature that engages the locking structure at least when the assembly is in or close to the tightened condition;
  - a stop member secured for common rotation with said threaded body;
  - a releasable coupling means arranged for releasably coupling said stop member and said second element for common rotation; and
  - spring means for resiliently activating said releasable coupling means;
  - wherein said releasable coupling means and said spring means are configured and arranged to allow relative rotation of said stop member and said second element in a screwing direction when a torque applied to the attachment device exceeds a predetermined screwing torque threshold and to allow relative rotation of said stop member and said second element in an unscrewing direction when an unscrewing torque applied to the attachment device exceeds a predetermined unscrewing torque threshold;
  - wherein said locking feature is a radially inner feature of said second element;
  - wherein the attachment device is a nut and said locking feature is to engage the locking structure being annular and provided axially beyond a thread of the threaded member; and
  - wherein said locking feature is adapted for cooperation with said locking structure being radially small enough to travel axially through the nut from said locking feature throughout a thread of said threaded body.

43. The device according to claim 42, wherein said releasable coupling means comprises a first and a second group of axially directed teeth, said first group secured to said stop member and said second group secured to said second element.

44. The device according to claim 42, wherein the device is a nut and the threaded member includes a male thread extending along a screwing axis and onto which a thread of the nut is screwed and unscrewed.

45. The device according to claim 42, wherein said stop member is adjacent said threaded body and said spring means is axially between the second element and said axial stop.

46. The device according to claim 42, wherein said stop member is rigidly secured to said first element, wherein said second element is mounted axially between said stop member and an axial stop secured to said first element and wherein said axial stop comprises a plastically bent end lip of said cylinder which is secured to said first element.

47. The device according to claim 42, wherein said first element has a clamping face for transmitting a clamping force into the assembly in the tightened condition, and said clamping face is axially between a thread of said threaded body and said lock.

48. The device of claim 42, wherein said locking feature is a female polygonal formation.

49. The device according to claim 42, wherein said second element is axially movable with respect to said first element, between an axial stop carried by said first element and said stop member.

50. A unitary self-locking screwing attachment device for joining a first male threaded member with a second member, at least one of the first or second members having locking structure, the attachment device comprising:
- a first element having a threaded body provided with a nut thread for thread engagement with the first male threaded member during screwing and unscrewing towards and away from a tightened condition, respectively; and
- a lock comprising:
  - a second element rotatably and captively supported onto said threaded body and provided with a locking feature to engage the locking structure at least when the assembly is in or close to the tightened condition;
  - a stop member secured for common rotation with said threaded body;
  - a releasable coupling means arranged for releasably coupling said stop member and said second element for common rotation; and
  - spring means for resiliently activating said releasable coupling means;
  - wherein said releasable coupling means and said spring means are configured and arranged to allow relative rotation of said stop member and said second element in a screwing direction when a torque applied to the device exceeds a predetermined screwing torque threshold and to allow relative rotation of said stop member and said second element in an unscrewing direction when an unscrewing torque applied to the device exceeds a predetermined unscrewing torque threshold;
  - wherein said lock is arranged beyond a rear axial end of said nut thread with respect to the screwing direction that is toward the tightened condition of the nut; and
  - wherein said locking feature is a radially inner feature of said second element.

51. The device according to claim 50, wherein said releasable coupling means comprises a first group and a second group of axially directed teeth, said first group secured to said stop member and said second group secured to said second element.

52. The device according to claim 50, wherein said stop member and said spring means have generally annular shapes and are accommodated within a supporting cylinder belonging to said first element.

53. The device according to claim 52, wherein said stop member is rigidly secured to said first element, wherein said second element is mounted axially between said stop member and an axial stop secured to said first element and wherein said axial stop comprises a plastically bent end lip of said cylinder which is secured to said first element.

54. The device according to claim 50, wherein said first element has a hollow supporting cylinder and wherein said spring means, said stop member, and said releasable coupling means are accommodated within a chamber which, in the tightened condition, is radially bounded inwardly by said threaded member and outwardly by an inner face of said cylinder.

55. The device according to claim 50, wherein said stop member is rigidly secured to said first element, and wherein said second element is mounted axially between said stop member and an axial stop secured to said first element.

56. The device according to claim 55, wherein said stop member is adjacent said threaded body and said spring means is axially between said second element and said axial stop.

57. The device according to claim 50, wherein said first element has a clamping face for transmitting a clamping force into said assembly in the tightened condition, and wherein said lock and said clamping face are on either side of said thread of said threaded body.

58. The device according to claim 57, wherein said clamping face is at or beyond a front end of said thread of said threaded body, with respect to the screwing direction.

59. The device according to claim 50, wherein said first element has a clamping face for transmitting a clamping force into the assembly in the tightened condition, and said clamping face is axially between said thread of said threaded body and said lock.

60. The device of claim 50, wherein said locking feature engages said locking structure, said locking structure being annular and provided axially beyond a thread of the threaded member.

61. The device of claim 60, wherein said locking feature is adapted for cooperation with the locking structure of the assembly, wherein the locking structure is radially small enough to travel axially through the device from said locking feature throughout the nut thread of said threaded body.

62. The device of claim 50, wherein said locking feature is a female polygonal formation.

63. The device of claim 50, wherein said spring means is of the compression type.

64. An assembly comprising:
a support onto which is securely mounted a threaded member in the form of a threaded tip,
at least one adjacent part through which the tip extends, and
a self-locking screwing attachment device according to claim 1, said attachment device being a nut adapted to be screwed onto said threaded tip thereby to fasten said adjacent part onto said support.

65. An assembly comprising:
a support onto which is securely mounted a threaded member in the form of a threaded tip having a male threading,
locking structure provided between the male threading and a free end of said threaded tip,
at least one adjacent part through which the tip extends, and
a self-locking screwing attachment device according to claim 50, said attachment device being adapted to be screwed onto said threaded tip thereby to fasten said adjacent part onto said support.

66. An assembly according to claim 65, wherein said threaded tip is provided with a gripping formation for a counter-torque tool axially behind said nut in the tightened condition of said nut.

67. A pipe assembling device comprising:
a first pipe end-piece externally provided with a male thread and with a first end sealing surface,
a second end-piece provided with a second end sealing surface and with a shoulder,
said first and second end sealing surfaces being adapted to engage each other and seal a fluid communication between said end-pieces with respect to the outside, and
a self-locking screwing attachment device according to claim 50,
wherein a clamping surface of said first element is adapted to engage said shoulder of said second-end-piece and to urge said sealing surfaces in sealing contact with each other as said screwing attachment device is being screwed onto said male thread, and wherein said locking structure is provided on said second end-piece.

68. A pipe assembling device according to claim 67, wherein said shoulder is axially between said second end sealing surface and said locking structure.

69. A pipe assembling device according to claim 67, wherein said locking structure is radially smaller than said self-locking screwing attachment device orifice from the locking feature throughout the thread, thereby to allow said self-locking screwing attachment device in an untightened condition to be axially removed from around said first end-piece.

70. A pipe assembling device according to claim 67, wherein said locking structure is a male polygonal formation.

* * * * *